Dec. 20, 1938.   L. G. TOWNSEND   2,140,567
APPARATUS FOR MAKING AND/OR UTILIZING PHOTO RECORDS
Filed Feb. 8, 1937   6 Sheets-Sheet 1
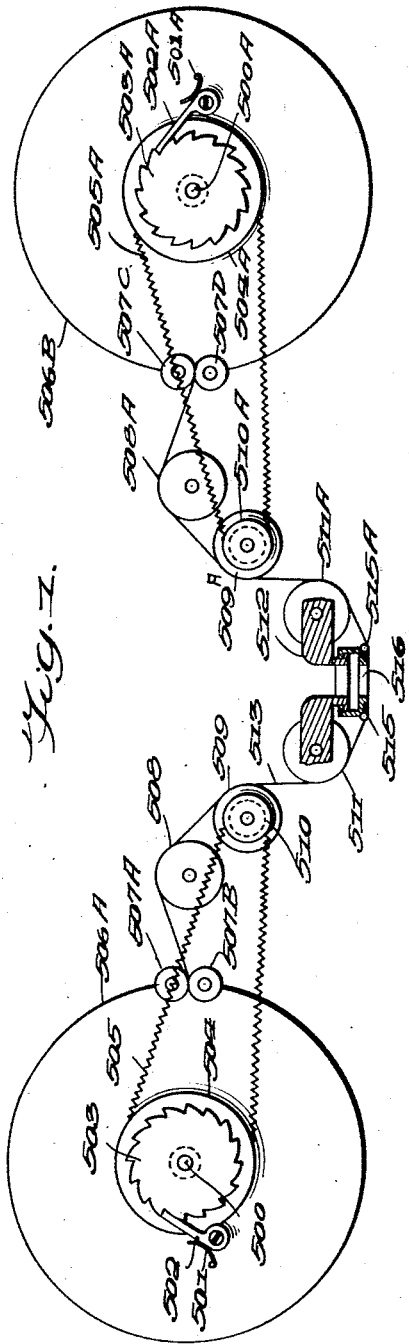
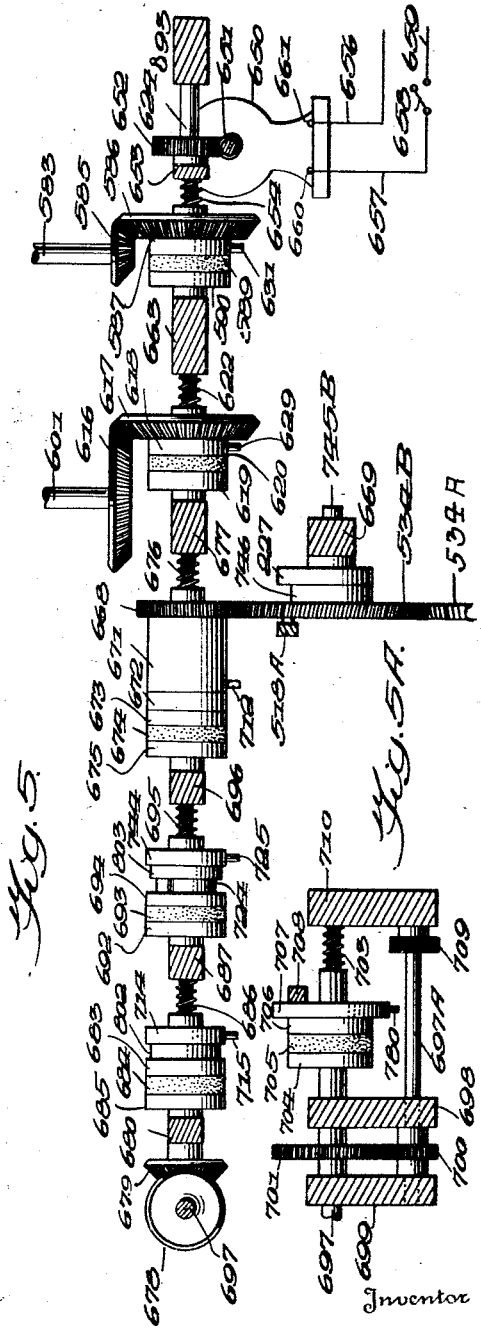
Inventor
Leonard G. Townsend,
By J. F. Motherhead
Attorney

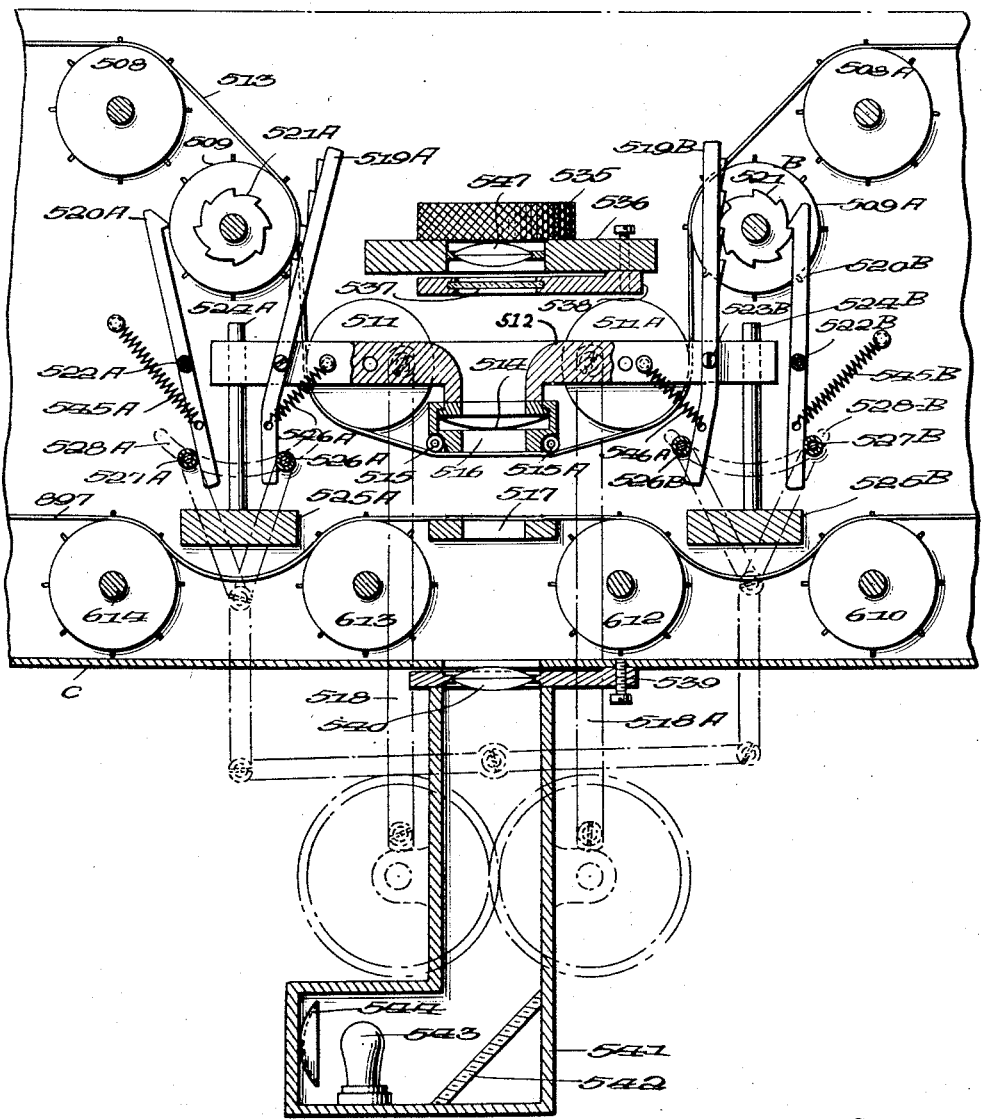

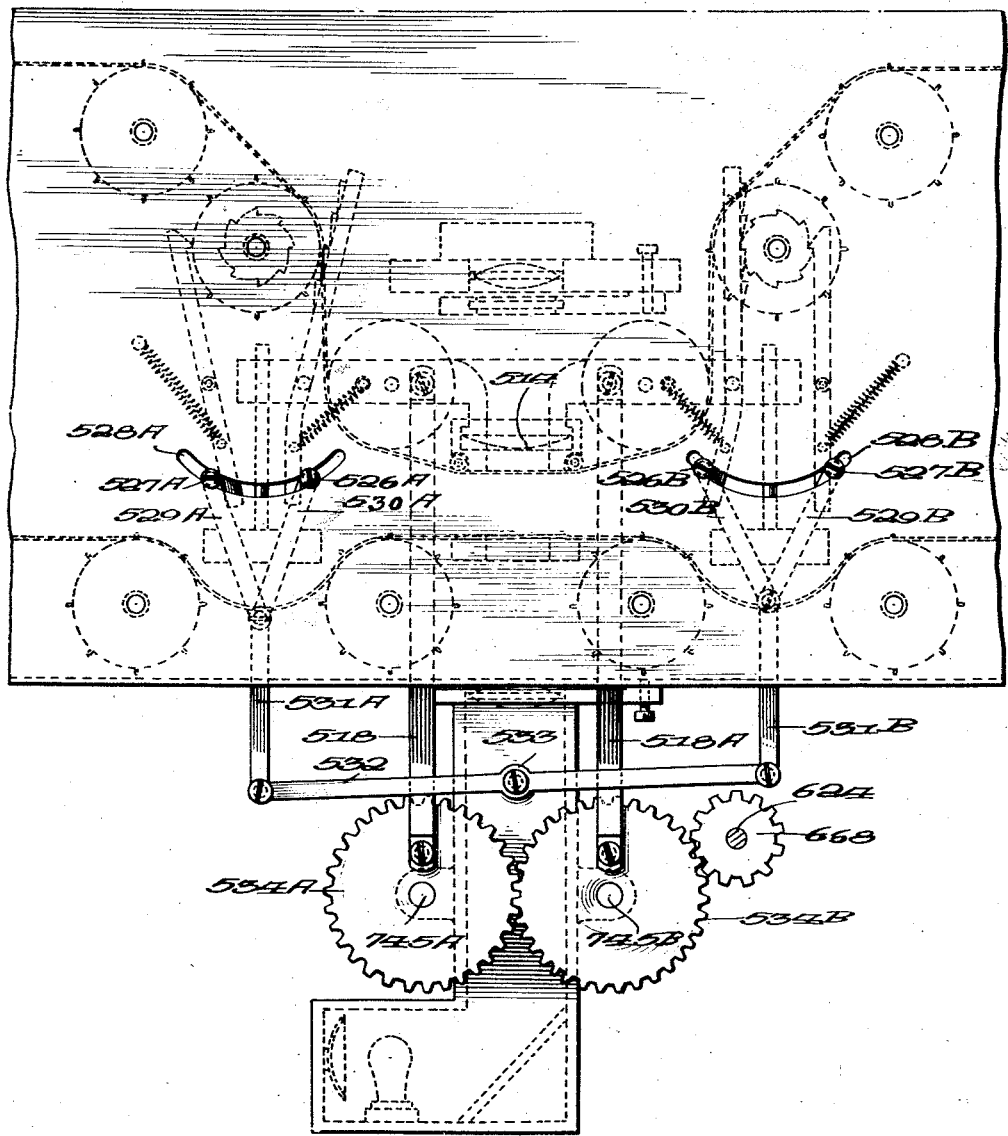

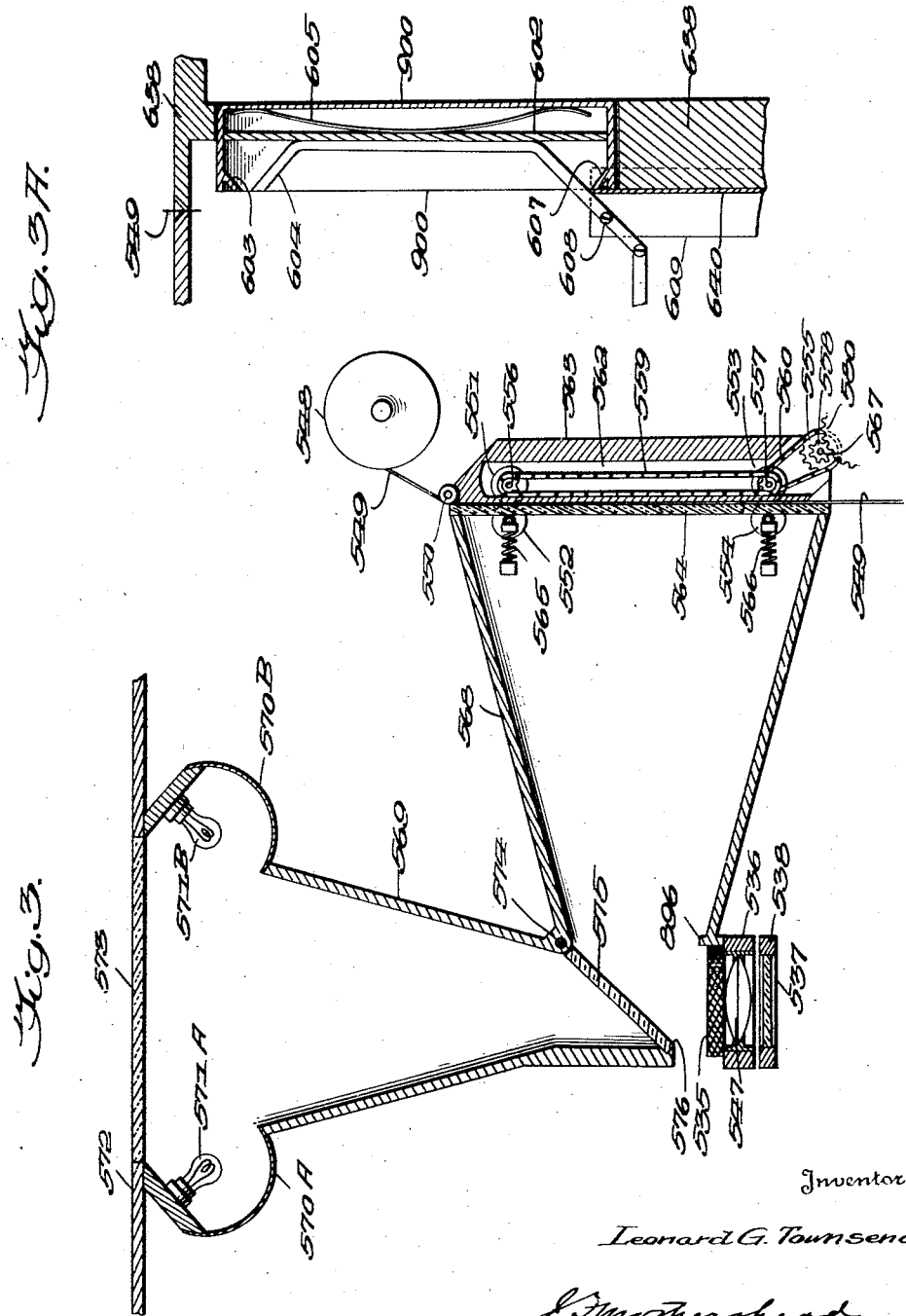

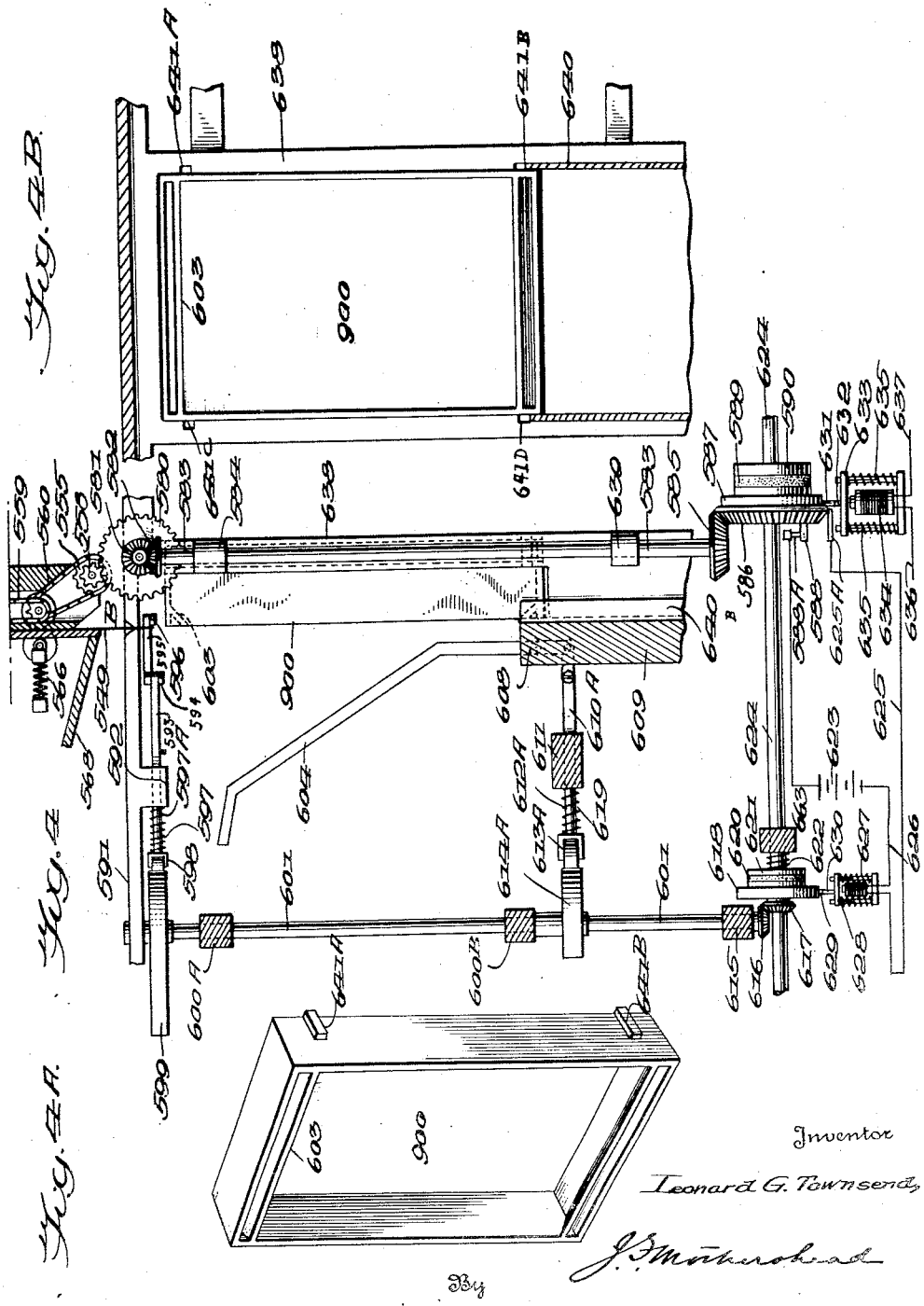

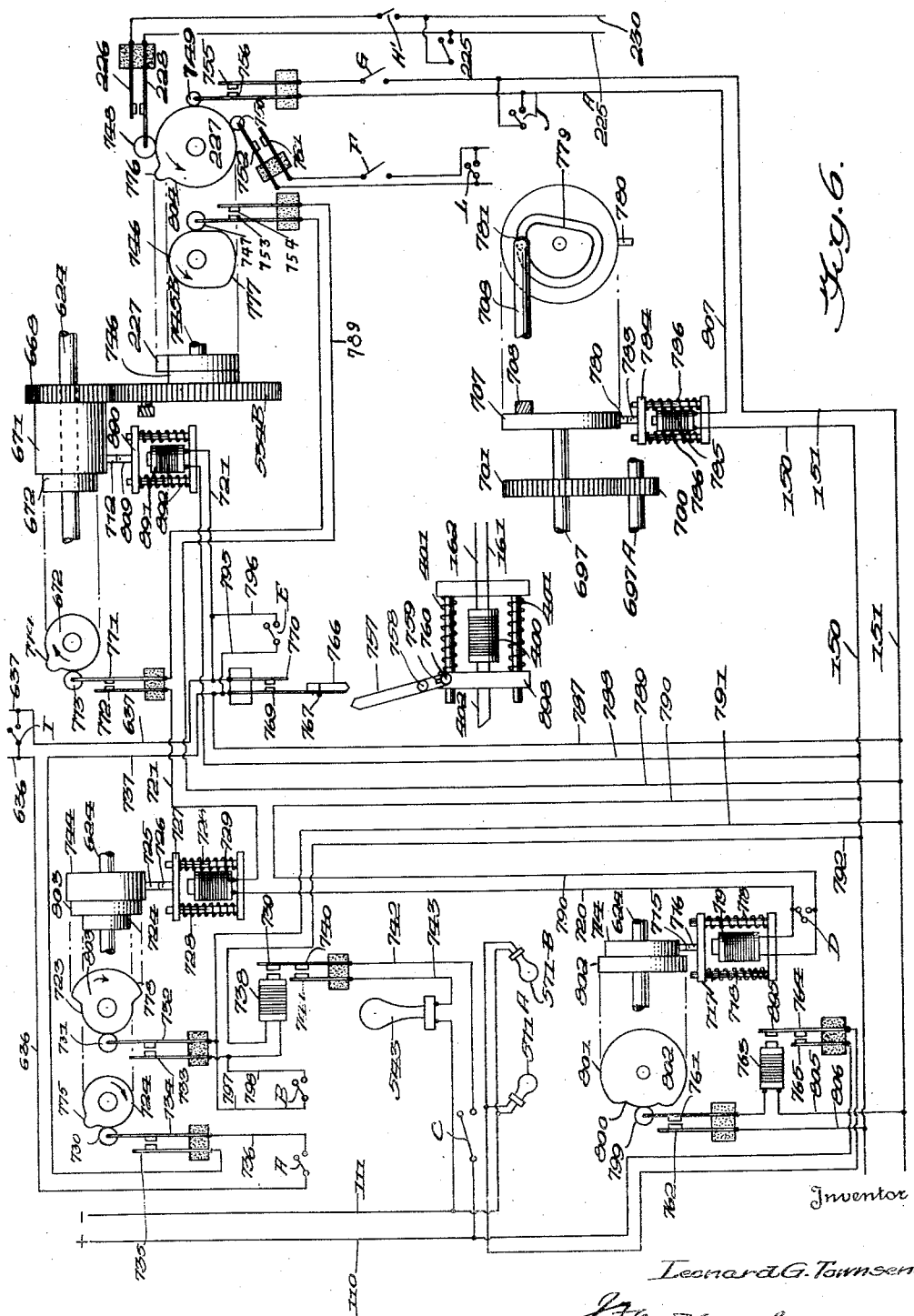

Patented Dec. 20, 1938

2,140,567

UNITED STATES PATENT OFFICE 2,140,567

APPARATUS FOR MAKING AND/OR UTILIZING PHOTO RECORDS

Leonard G. Townsend, Washington, D. C.

Application February 8, 1937, Serial No. 125,258

17 Claims. (Cl. 88—24)

(Granted under the act of March 3, 1883, as amended April 30, 1928; 370 O. G. 757)

This invention relates to an apparatus for making and/or utilizing photo-records. My application Serial Number 88,903, filed July 3, 1936, discloses a system for selecting and indexing records from a series of records in accordance with the indicia appearing on punched-cards corresponding to certain individual records in said series. The present invention is related to the invention disclosed in said application to the extent that the method and apparatus disclosed therein may be used conjointly with the invention disclosed herein.

It is an object of this invention to provide a photographic machine having a pair of adjacent film tracks, a viewing screen, a copying platen and a projection printer, together with selective means whereby the machine may be operated as a camera or projector to make photographic records on or project images from a film carried in either of the film tracks on to a sensitized sheet of a projection printer or on to a viewing screen, and in which contact prints may be made from the film carried in one of the film tracks upon the film carried in the other of the film tracks.

Modern business methods require that records be capable of being filed in small space, and that they be capable of being referred to and/or reproduced with a minimum loss of time and labor. In the past business was content to let its records accumulate and be filed in their original form but space limitations of today demand, more and more, that records be condensed in form for storage, yet readily available for reference and reproduction purposes.

The present invention lends itself to the making of micro-photographic records of documents, the reproduction of said documents to the same or a larger scale and the ready reading or checking of any record made thereby.

It is the further object of this invention to provide a machine which is compact in arrangement, economical to manufacture and use, and capable of being speedily changed from one type of operation to another.

Other objects of the invention will appear from the more detailed description of the invention hereinafter following when taken in conjunction with the accompanying drawings wherein:

Fig. 1 is a schematic diagram in front elevation partially in section showing the film magazines, film feed sprockets, film gate or aperture, and the film takeup device of the upper film track of the machine.

Fig. 2 is a vertical sectional view of the machine showing the relation between the upper and lower film tracks, the light transmission and ocular systems, together with certain parts of the indexing mechanism for automatically indexing the film in the upper film track.

Fig. 2—A is a front elevational view of the machine showing certain parts of the indexing mechanism that are not shown in the corresponding sectional view (Fig. 2).

Fig. 3 is a vertical sectional view of the lens mirror system of the machine showing the interchangeable viewing screen and camera platen and the upper portion of the sensitized paper feed mechanism.

Fig. 3—A is a vertical sectional detail view of the sensitized paper receiving drawer and a part of the associated sheet stacking device.

Fig. 4 is a vertical sectional detail view of the lower portion of the sensitized paper feed mechanism together with the associated paper cut-off knife and stacking device and the magnetic trip mechanism for rendering the same operative.

Fig. 4—A shows in perspective the sensitized paper sheet receiving drawer of the machine.

Fig. 4—B is a detailed sectional view on line B—B of Fig. 4 showing the sensitized paper receiving drawer with its light tight cover removed.

Fig. 5 is an assembly view of the driving motor together with various clutches and gear trains utilized selectively to apply power to the various moving parts of the machine.

Fig. 5—A is an assembly view of a further clutch driven from the motor shown in Fig. 5.

Fig. 6 is a schematic circuit diagram showing the control circuits for selectively operating the trip mechanism of the clutches shown in Figs. 5 and 5—A.

In Fig. 1 of the drawings, 506—A and 506—B are daylight loading film magazines into one of which a reel of unexposed film is placed with the axial opening of said reel engaging the pin 500. The film 513 extends between the reels in the magazines as follows:

From the magazine 506—A between upper and lower guide rolls 507—A and 507—B. From thence it is threaded over sprockets 508, 509 and 511. Then over roll 515 across the aperture 516 over roll 515—A over sprockets 511—A, 509—A, and 508—A, and thence between upper and lower guide rolls 507—C and 507—D into film magazine 506—B and onto the reel therein. The ends of the film feed sprockets 509 and 509—A are formed with pulleys 510 and 510—A, respectively. Magazines 506—A and 506—B have associated therewith pulleys 504 and 504—A, respectively. Pulleys 504 and 504—A have mounted thereon or made therewith ratchet wheels 503 and 503—A, respectively. Pulley 504 is urged to rotate by the spring belt 505 mounted on and driven by pulley 510. Pulley 504—A is urged to rotate by the spring belt 505—A driven by pulley 510—A. Ratchet wheels 503 and 503—A may be prevented from turning in one direction by pawls 502 and 502—A, respectively. Pawls 502 and 502—A are urged towards the ratchets associated therewith by springs 501 and 501—A, respectively.

The parts of the machine depicted in Fig. 1 are housed within a casing C (Fig. 2). The sprockets 508, 509, 508—A and 509—A are journaled in bearings mounted in fixed relation to the casing C or a frame carried thereby. Sprockets 511 and 511—A are journaled in bearings carried by the vertically reciprocable member 512. The vertically reciprocable member 512 is restrained from moving in a sidewise direction by guide rods 524—A and 524—B of which there are two of each extending through guide holes in said member. The guide rods 524—A and 524—B are mounted on support members 525—A and 525—B, respectively, which in turn are supported by the housing or a frame within the housing. The vertically reciprocable member 512 carries rollers 515 and 515—A together with the plate containing film gate or aperture 516. Rollers 515 and 515—A and the apertured plate lying between are adapted to be moved slightly in a vertical direction with respect to the vertically reciprocable member 512. A pair of springs 514 are placed out of line with the aperture 516 and normally tend to hold the rollers 515, 515—A and the plate containing aperture 516 in its extreme downward position with respect to the member 512.

A ratchet wheel 521—A is mounted on the shaft with sprocket 509 and a ratchet wheel 521—B is mounted on the shaft and adapted to turn with sprocket 509—A.

A ratcheting arm or rack member 519—A is mounted pivotally on member 512 by means of the pin 523—A. Ratcheting arm or rack member 519—B is pivotally mounted on member 512 by means of the pin 523—B. Ratcheting arm or rack member 519—A is normally urged towards the ratchet wheel 521—A by means of the spring 546—A connected between the lower portion of said arm and the member 512. Ratcheting arm or rack member 519—B is normally urged toward the ratchet wheel 521—B by means of a spring 546—B connected between the lower part of said arm and the member 512. A pawl 520—A is pivoted by means of the pin 522—A to the housing C. The pawl 520—A is normally urged towards the ratchet wheel 521—A by means of the spring 545—A connected between the lower portion of said pawl and the frame member C. Pawl 520—B is pivoted by means of the pin 522—B to the frame or casing C. The pawl 520—B is normally urged towards ratchet wheel 521—B by means of the spring 545—B connected between the lower part of said pawl and the frame.

In Figs. 2 and 2—A of the drawing ratcheting arm or rack member 519—A and pawl member 520—A are shown in inoperative position while ratcheting arm or rack member 519—B and pawl 520—B are shown in operative position. The pawls and ratcheting arms are put into operative position or inoperative position by means of the button or control knob 533 fastened to rocker arm 532. Pivoted to one end of the rocker arm 532 is a link 531—A which in turn is pivoted to link members 529—A and 530—A. Link members 529—A and 530—A are provided at their upper ends with pins 527—A and 526—A one end of which lies within the curved slot 528—A and the other ends of which rest against the lower portion of pivoted pawl member 520—A and ratcheting arm 519—A. The other end of rocker arm 532 is provided with a link member 531—B one end of which is pivoted thereto. The other end of link member 531—B is pivoted to links 530—B and 529—B. Link members 530—B and 529—B are provided at their upper ends with pins 526—B and 527—B, one end of which lies within curved slot 528—B in the frame or housing C, while the other ends thereof engage the lower ends of ratcheting arm 519—B and pawl member 520—B. It is thus seen that when the rocker arm 532 is rocked to the left, pawl 520—A and ratcheting arm 519—A are withdrawn to inoperative position while ratcheting arm 519—B and pawl 520—B are permitted to engage the ratchet wheel 521—B. By rotating the button, or control knob 533, in clock-wise direction the rocker arm 532 may be moved to such a position that ratcheting arm 519—B and pawl member 520—B may be put into inoperative position and pawl 520—A and ratcheting arm 519—A may be put into operative position.

Below and in alignment with aperture 516 (Fig. 2) there is a second aperture 517 provided in a stationary aperture member. A film is carried across aperture 517 by means of sprockets 610, 612, 613 and 614. These sprockets correspond to sprockets 610, 612, 613 and 614 disclosed in my application Serial No. 88,903, filed July 3, 1936. They are driven by the means set forth in said application. Below the aperture 517, and in alignment therewith the casing C is provided with an opening over which condensing lens 540 is adapted to be brought. The condensing lens 540 is mounted in a frame 539 that may be swung into or out of registry with the aperture in the casing. Immediately below the aperture 517 and the opening in the casing C there is a lamp house 541 provided with a lamp 543, a condensing reflector 544 and a mirror 542 mounted at such an angle that the light from the lamp 543 is reflected thereby through the condensing lens 540 and thence through the aperture 517. Above the aperture 516 and in line therewith is lens carrying member 536 carrying objective lens 547. Pivoted to the member 536 is a member 538 carrying a ruby glass 537 which may be swung into or out of alignment with the lens 547 and the aperture 516. The lens 547 is equipped with any desired focusing arrangement such as the focusing barrel 535, and any desired type of electric shutter known to the art.

It may also be understood that, whereas, for simplicity, a conventional type of lens assembly has been shown, such assembly may include one of the many types of electric shutters known to the art. Such a shutter may be wired into the usual low voltage, light actuating relay circuit in the usual manner.

The reciprocable frame member 512 has pivoted thereto pitman arms 518 and 518—A which are pivoted, respectively, to opposite sides of the member. The other ends of pitman arms 518 and 518—A are attached to bell cranks carried by gears 534—A and 534—B, (Fig. 2—A). Gears 534—A and 534—B are mounted on shafts 745—A and 745—B, respectively. These gears are of the same size and enmeshed. Gear 534—B is driven by gear 668. From the above it will be apparent that, as gears 534—A and 534—B revolve, the frame member 512 is caused to be moved up and down.

Immediately above objective lens 547 (Fig. 3) there is provided a light tight casing 569 which has provided in its uppermost extremities light reflectors 570—A and 570—B into which are fitted lamps 571—A and 571—B. The top of this casing is made flush with the top of the machine which is shown at 572. The top opening of the light-tight casing 569 is provided with a ground glass viewing screen 573 which is interchangeable with a clear glass camera platen. At right angles to the light tight casing 569 there is a second light tight casing 568. This casing has at one end thereof a transparent member 564 behind which sensitized paper 549 may be drawn. Sensitized paper 549 is fed in front of transparent member 564 from roll 548 over roller 550 between member 564 and member 563. Member 563 is provided with an opening 562 in which is carried a ladder chain 559 which engages sprockets 556 and 557. Sprocket 557 is rotated by means of a second ladder chain 560 by means of sprocket 555. Sprocket 555 has made integral therewith or mounted on shaft 567 therewith pinion 558 which is driven from gear 580. Sprockets 556 and 557 rotate feed rollers 551 and 553. These rollers extend through the back member 563 and into contact with the sensitized paper 549. On the opposite sides of the sensitized paper 549 from feed rollers 551 and 553 are mounted opposing rolls 552 and 554, respectively. These rolls are held by tension springs 565 and 566, respectively, against the sensitized paper 549 to keep the paper in firm contact with feed rolls 551 and 553, respectively.

At the juncture of light-tight casings 568 and 569 a mirror 575 is pivotally mounted on shaft 574 so that the mirror may be selectively positioned with its lower edge in contact with abutment 576 of the casing 569 or abutment 896 of casing 568. Below the casing 568 the sensitized paper 549 extends through an opening in frame member 638 (Fig. 3—A and Fig. 4) to the stacking compartment. The stacking compartment frame 638 is provided with an opening in the back thereof into which the sensitized paper sheet receiving drawer 900 is adapted to be placed. The sheet receiving drawer is provided with a false bottom 602 which is spring-pressed outwardly by a pair of leaf springs 605. The open side of the sensitized paper sheet receiving drawer is provided with a pair of lips 603 and 607, respectively, at the top and bottom of the drawer to prevent the tendency of the paper to spring out of the drawer when a sheet thereof has been moved into the drawer by means of the stacking arm 604, which is pivoted at the pin 608 on frame member 609. The sensitized paper receiving drawer 900 is provided with a light-tight cover 640 which is shown in Fig. 3—A as being withdrawn from the sensitized paper sheet receiving drawer 900. The drawer 900 is provided with guides 641—A, 641—B, 641—C and 641—D (Figs. 4—A and 4—B) adapted to slide in horizontal slots provided in frame member 638.

The relation between the sensitized paper feed mechanism shown in Fig. 3 and the sheet receiving drawer shown in Fig. 4 wherein the pinion 558 is shown engaged to be driven by gear 580 mounted upon the same shaft as pivotal gear 581 which engages with pivotal gear 582 mounted upon shaft 583. The shaft 583 is journaled in bearings 584 and 639 mounted upon the frame member 638. Shaft 583 has mounted thereon beveled gear 585 which engages beveled gear 586 loosely mounted on shaft 624. The beveled gear 586 is provided with a shoulder 587 and between which, and the disc 590 mounted on shaft 624, is a friction member 589 which tends to cause beveled gear 586 to turn with shaft 624 on the disc 590 mounted thereon. The beveled gear 586 is normally prevented from turning with shaft 624 by means of the pin 631 extending therefrom and into engagement with stop member 632 mounted on electro-magnet armature 633. The armature 633 is adapted to be pulled down to permit pins 631 and stop member 632 to disengage. The armature 633 is pulled down by electro-magnet 634 against the tension of springs 635. The electro-magnet 634 is provided with leads 636 and 637. A second pin 588 is affixed to the beveled gear 586 and this pin 588 is adapted to engage electrical contact spring 588—A slightly before the gear 586 returns to the position where pin 631 engages stop member 632. The contact spring 588—A is connected to one terminal of the battery 623 while the other terminal thereof is connected to the lead 626 to electro-magnet 627. The lead 625 from electro-magnet 627 is connected to a slip spring-contact 625—A in contact with beveled gear 586. The electro-magnet 627 is provided with an armature 628 carrying a stop member 630 normally adapted to engage pin 629 mounted on member 618. The member 618 is made integral with bevel gear 617 and the two are loosely mounted on shaft 624. Shaft 624 is provided with a disc 621 slidably mounted thereon and splined thereto. Between the member 618 and the disc 621 there is a friction disc 620. A spring 622 bears upon the disc 621 and urges it to press the member 621 toward the member 618 thus gripping the member 620, and tending to urge the bevel gear 617 and member 618 in the direction of rotation of the shaft 624. Shaft 624 is appropriately mounted in bearing members such as 663. The bevel gear 617 engages a bevel gear 616 mounted on shaft 601. Shaft 601 is journaled in bearings at 600—A, 600—B and 615. Between the bearings 600—B and 615—B a cam 614—A is mounted on the shaft 601 to turn therewith. Cam follower roller 613—A mounted on cam follower rod 612—A is normally urged into contact with the cam 614—A by means of the spring 619 surrounding the cam follower rod 612—A and positioned between the cam follower rod support 611. The cam follower 612—A has pivoted thereto a link 610—A which is also pivoted to the lower end of the stacking lever 604. Above the bearing 600—A a second cam 599 is mounted on shaft 601 to turn therewith. Opposite cam 599 there is mounted the push rod 597 which is provided at one end thereof with a cam follower roller 598. Push rod 597 is mounted slidably in supporting member 592. The cam follower roller 598 is normally held in contact with the cam 599 by means of the spring 597—A mounted between the supporting means 592 and the cam follower roller 598. Link member 593 is pivoted to the end of push rod 597 and also to one end of the paper shearing knife 595. The other end of the paper shearing knife is pivotally mounted by means of pin 596 to the frame member 591. The cams 614—A and 599 are so mounted on shaft 601 that the stacking arm 604 is in the position shown in the drawings when cam 599 is turned to such a position that the cam follower roller 598 is moved against spring 597—A to cause the push rod 597 to bring the knife 595 across the aperture in frame member 591 through which the sensitized paper 549 extends. The cam 614—A is so phased with respect to cam 599 that its dwell engages the cam follower 613—A only after the shearing knife 595 has been moved into cutting position.

The shaft 624 is shown in Fig. 5 together with the means for rotating shafts 601 and 583 discussed above together with the means for operating the various other devices operated therefrom. The shaft 624 is mounted in bearing members 893, 653, 663, 677, 696, 687 and 680. Shaft 624 has mounted thereon and fixed thereto gear 652 which is driven by worm 651 mounted on the shaft of the motor 650. The terminals 660 and 661 of the motor 650 are connected, respectively, to leads 657 and 656. Lead 657 is connected to one side of switch 658, the other side of which is connected to conductor 659. Any appropriate source of potential for energizing the motor 650 is connected to the conductors 656 and 659 so that when the switch 658 is closed the motor 650 will drive the shaft 624 at an appropriate speed. Loosely mounted on shaft 624 is a gear 668 having a hub 671. The hub 671 is provided with a pin 712 extending therefrom. Cam 672 is made integral with the hub 671 and adjacent to the cam is a supplemental friction plate 673 between which and the friction plate 675 attached to the shaft 624 is a friction clutch disc 674. The gear 668, hub 671, cam 672 and friction plate 673 are urged by spring 676 towards the friction disc member 675 so that the gear 668, etc. is normally urged to turn with the shaft 624. The gear 668, hub 671, etc. are normally prevented from rotating with shaft 624 by means of the pin 712 which normally lies against the stop member 809 (Fig. 6). The gear 668 engages gear 534—B mounted on shaft 745—B. Integral with the gear 534—B are a pair of cams 746 and 227. The structure and relation of these cams is better shown in Fig. 6. The gear 534—B engages gear 534—A of like size. The gear 668 has a diameter equal to one half the diameter of gears 534—B and 534—A. Gears 534—A and 534—B are provided with pitman arms 518 and 518—A, respectively. This feature of the construction has been described above in connection with Figs. 2 and 2—A. The shaft 745—B is journaled in bearing member 669. Friction disc 692 is mounted on shaft 624 and turns therewith. Friction disc 694, cam 724, cam 803 and collar member 744 are integrally made and loosely mounted on shaft 624. Between the members 692 and 694 friction member 693 is interposed. The friction disc 694 and the parts made integral therewith are normally urged towards member 692 by means of the spring 695 mounted between the support 696 and the hub of said member, so that the elements 694, 724, 803 and 744 normally tend to turn with the shaft 624. These members are restrained from turning by the pin 725 affixed to member 744 by stop member 726 (Fig. 6). Friction disc member 685 is mounted on shaft 624 to turn therewith while friction member 683, cam 802, and collar 714, which are made integral, are loosely mounted on shaft 624. Between members 685 and 683 friction member 684 is mounted. The spring 686 mounted between the bearing support 687 and the collar of member 714 normally tends to move the members 683, 802 and 714 to be turned with the shaft 624. These members are prevented from turning with shaft 624 except for certain selected times by the pin 715 affixed to member 714. When the pin 715 comes into contact with stop member 716 (Fig. 6) motion of cam 802 is arrested. Bevel gear 679 engages bevel gear 678 mounted on shaft 697 and turns said shaft. Shaft 697 is mounted at right angles to shaft 624 and the apparatus associated with this shaft is best seen in Fig. 5—A. Shaft 697 is journaled in bearing members 698, 699 and 710. A second shaft 697—A is also journaled in bearing members 698, 699 and 710. The gear 701 is mounted on shaft 697 and engages gear 700 mounted on shaft 697—A. A second gear 709 is mounted on shaft 697—A. Disc 704 is mounted on shaft 697 and turns therewith. A second friction member 706, together with a cam member 707 made integral therewith is loosely mounted on shaft 697. Between the friction members 704 and 706 is a friction disc member 705 adapted to contact with the members 704 and 706. The spring 703 normally pushes the friction member 706 and cam member 707 towards friction member 704 to urge these members to turn with shaft 697. The friction member 706 and the cam member 707 are normally restrained from moving with the shaft 697 by means of the pin 780 attached to the cam member 707 by engagement of said pin member with the stop member 783 (Fig. 6). The cam member 707 is provided with a cam slot 779 (Fig. 6) into which a cam follower roller 781 (Fig. 6) mounted on crank rod 708 is adapted to move. The gear 709 mounted on shaft 697—A is used to drive the feed and eject rolls of a punched card feed and eject assembly familiar to the art.

In Fig. 6 leads 110 and 111 are connected to an appropriate source of potential such as 110 volt commercial power supply. These leads correspond to leads 110 and 111 in Figs. 4 and 10 of my application Serial Number 88,903, filed July 3, 1936, the disclosure of which application is incorporated herein by reference. Lead 111 is connected to lamp 543 (Fig. 2) and to lamps 571—A and 571—B (Fig. 3). The other terminal of lamp 543 is connected by means of wire 743 to spring contact 741 opposed to spring contact 740. Contact 740 is connected by means of conductor 742 to one terminal of the switch C, the other terminal of which is connected to lead 110. The terminals of lamps 571—A and 571—B not connected to lead 111 are connected to spring contact 764. Opposed to spring contact 764 is a second spring contact 765 which is connected to lead 110. Leads 150 and 151 are connected to a D. C. source of potential of 15 volts; for example, lead 150 is connected to spring contact 762 opposed to spring contact 761. The contact 761 is connected to one of the terminals of electro-magnet 763. The other terminal of electro-magnet 763 is connected by means of lead 805 to the lead 151. The electro-magnet 763 is provided with a soft iron armature 895 mounted on spring contact 764 in such a manner that when electro-magnet 763 is energized the armature 895 is drawn thereto to close a connection between contacts 764 and 765. Spring contact 761 has mounted thereon a cam follower roller 799 lying against the surface of cam 802 which is provided with a dwell 800 and a high portion 801. The association of cam 802 with the shaft 624 has been described above in connection with Figs. 4 and 5. The cam 802 when in the position shown with the cam follower roller 799 lying within the dwell 800 contacts 761 and 762 are in open position due to the spring tension of spring contact 761. When the high portion 801 of the cam 802 bears against roller 799 the contacts 761 and 762 are closed. Adjacent to the cam 802 and fixed thereto is the member 714 carrying pin 715 which normally abuts against stop member 716 mounted on the armature 717 of the electro-magnet 719. The armature 717 and stop member 716 are normally urged to the position shown by the springs 718. The electro-magnet 719 has one of its terminals connected by means of conductor 720 to one of the terminals of electro-magnet 729. The other terminal of electro-magnet 719 is connected by means of conductor 790 to the battery lead 150. The second terminal of electro-magnet 729 is connected by means of the conductor 721 to spring contact 772. Spring contact 771 is opposed to contact 772. Spring contact 771 is connected to spring contact 753 which is opposed to spring contact 754. Spring contact 754 is connected by means of conductor 789 to battery lead 151. Switch D is connected between conductors 720 and 790 and when closed it short-circuits the winding of electro-magnet 719. Battery lead 150 is connected by way of conductor 792 to one of the terminals of electro-magnet 738. The other terminal of electro-magnet 738 is connected to spring contact 733 opposed to spring contact 732. The spring contact 732 is connected by means of conductor 791 to the battery lead 151. Spring contacts 732 and 733 are connected by means of conductors 797 and 798, respectively, to terminals of switch B. The electro-magnet 738 is provided with a soft iron armature 739 mounted on spring contact 740. When electro-magnet 738 is energized and armature 739 is drawn thereagainst, spring contacts 740 and 741 are closed. These contacts are permitted to open by virtue of the spring tension of spring contact 740 when the electro-magnet 738 is de-energized.

Electro-magnet 729 has associated therewith an armature 727, which is normally pushed away, to the position shown in the drawings, from the electro-magnet 729 by means of the springs 728. The armature 727 carries a stop member 726 mounted thereon to cooperate with pin 725 mounted on member 744. The member 744 is made integral with cams 724 and 803. Cam 803 having a dwell 723 and high portion 778 cooperates with cam follower roller 731, mounted on spring contact member 732. When the roller 731 lies within the dwell 723 of the cam 803 spring contacts 732 and 733 are open. These contacts are closed when the high portion of cam 778 pushes against roller 731. Cam 724 having a high portion 775 of limited extent cooperates with cam follower roller 730 mounted on spring contact 734 opposed to spring contact 735. Contacts 734 and 735 are closed only at such times as high portion 775 of cam 724 is in engagement with the roller 730. The cams 724 and 803 are so mounted with respect to each other that contacts 734 and 735 are closed for a short time after contacts 732 and 733 are opened. Spring contact 734 is connected by means of conductor 736 to one terminal of switch A the other terminal of which is connected by means of conductor 636 to one terminal of the electro-magnet 634 (Fig. 4). The spring contact 735 is connected by means of the conductor 737 to the conductor 787 which is in turn connected to battery lead 151. Conductor 788 connected to battery lead 150 is connected to one terminal of the electro-magnet 891. The other terminal of the electro-magnet 891 is connected by means of conductor 721 to the spring contact 770 opposed to spring contact 769. The spring contact 769 is connected by means of conductor 787 to battery lead 151. Hinged member 766 hinged at 767 is mounted on spring contact 769. The hinged member 766 is readily rotatable to the left but when an attempt is made to rotate it to the right it attains a vertical position and carries the spring contact 769 along with it into contact with spring contact 770. Conductors 795 and 796 are connected to spring contacts 769 and 770, respectively, and to the terminals of switch E.

Electro-magnet 400 is connected by means of leads 161 and 162 to an actuating circuit in accordance with that shown in Fig. 10 of my application Serial Number 88,903, and this electro-magnet corresponds to electro-magnet 400 disclosed in said application. The electro-magnet 400 is provided with an armature 898 having thereon a latch member 402. The armature 898 is normally urged away from the electro-magnet 400 by means of the springs 401. Mounted on the electro-magnet armature 898 is a pin 760 which engages with and operates in a slot 759 of lever member 757 which is pivoted on the pin 758. The electro-magnet 400 is shown in Fig. 6 in energized position.

Electro-magnet 891 is provided with an armature 890 normally moved to de-energized position by springs 892. Mounted on armature 890 is a stop member 809 adapted to engage and hold pin 712 mounted on hub member 671. The hub member 671, cam 672 and gear 668 are made integral and rotate together when the armature 890 and stop member 809 permit the pin member 712 to pass. The cam 672 has a high portion 774 adapted to engage the cam follower roller 773 mounted on spring contact member 771 to close a circuit between contacts 771 and 772. In this arrangement the high portion 774 is so placed with respect to the pin 712 as to permit the closure of contacts 771 and 772 only at such time as the pin 712 is immediately approaching stop member 809. The gear 668 which turns with cam 672 meshes with and drives gear 534—B. Gear 534—B is of twice the diameter of gear 668. Gear 534—B is mounted on shaft 745—B and turns cams 746 and 227 mounted on said shaft. The cam 746 is provided with a high portion 777 which is opposed to the roller 747.

The cam 227 is provided with a high portion 776 which bears against cam follower rollers 750, 749 and 748 in the order named. Cam follower roller 750 is mounted on spring contact 752 opposed to spring contact 751. Spring 751 is connected to one terminal of the switch F while the other terminal thereof is connected to one terminal of the switch L. Spring contact 752 is connected to the remaining contact of switch L and the two terminals of switch L are connected in the key re-set circuit of a key re-set system similar to that disclosed in my application Serial Number 88,903.

The cam follower roller 749 is mounted on spring contact member 756 opposed to spring contact member 755. The spring contact 756 is connected by means of conductor 807 to one terminal of the electro-magnet 785. Spring contact 755 is connected to one terminal of the switch G the other terminal of which is connected to battery lead 151. Battery lead 151 and conductor 807 have connected thereacross a switch J. Battery lead 150 is connected to the other terminal of electro-magnet 785. The electro-magnet 785 has an armature 784 which is normally moved away from the electro-magnet by means of the springs 786. Mounted on the armature 784 is a stop member 783 adapted to engage with and hold the pin 780 mounted on cam member 707. The cam member 707 turns with shaft 697 only when the armature 784 of electro-magnet 785 is pulled downwardly. Gear 701 mounted on shaft 697 drives gear 700 mounted on shaft 697—A. Shaft 697—A is used to drive the gear 709 (Fig. 5—A) which in turn acts as a drive for the feed and eject rolls of a punched card feed and eject assembly familiar to the art.

Cam follower roller 748 is mounted on spring contact 228 opposed to spring contact 226. Spring contact 226 and 228 together with the cam 227 correspond to the elements of like number shown on Fig. 10 of my application Serial Number 88,903. Spring contact 226 is connected to one terminal of the switch H—I the other terminal of which is connected to the conductor 230. Spring contact 228 is connected to conductor 225—A. Conductors 225—A and 230 have connected thereacross a switch 225. The conductors 225—A and 230 are connected to a re-set circuit similar to that disclosed in my application Serial Number 88,903.

Conductor 721 connected to spring contact 770 is connected by way of conductor 637 to one terminal of the electro-magnet 634 (Fig. 4). The electro-magnet 634 may be short-circuited by the switch I connected across the conductors 636 and 637 connected thereto.

In describing the operation of the machine it will be assumed, first, that the machine is to be used as a camera operating from the upper film track. In this case the switches A and I will be closed while switches B, C, D, F, G and H—I will be permitted to remain open. With unexposed film 513 loaded in the upper film track as indicated in Fig. 1, and with the lever 532, Fig. 2 and Fig. 2—A tilted to such a position as to make the desired set of ratchets and pawls operative to feed the film from the unexposed reel to the exposed reel and with the desired document placed face downward on transparent platen 573 (Fig. 3) and with the mirror 575 swung against abutment 896 (Fig. 3), switch E is momentarily closed allowing a current to flow from the 15 volt mains 150 and 151 through leads 787 and 788 and electro-magnet 891. This allows the armature 890 to be attracted against the tension of springs 892. Stop member 809 is thus permitted to release pin 712 permitting the gear 668 and cam 672 to make one revolution after which the pin 712 again comes into contact with stop member 809 which is returned to its original position after the opening of switch E. Gear 668 which meshes with gear 534—B is thus permitted to rotate gears 534—A and 534—B (Fig. 2—A) one-half a revolution. The movement of gears 534—A and 534—B pulls the reciprocable frame member 512 (Fig. 2) downward by means of the pitman arms 518 and 518—A as described heretofore. The movement downward of the reciprocable frame member 512 brings film 516 (Fig. 2) and the film 513 carried thereunder into registry with the aperture 517. Pressure is maintained upon the film by means of the springs 514.

As the reciprocable member 512 and included assembly (Fig. 2) move downward, film 513 is drawn from magazine 506—A (Fig. 1), by this downward movement. Pawl 520—A (Fig. 2) permits movement of film from this direction because of its disengagement with the ratchet teeth on the ratchet wheel 521—A. The film is not permitted to be drawn from magazine 506—B as pawl 520—B is in contact with the teeth on ratchet wheel 521—B on sprocket 509—A.

With this first half rotation of gears 534—A and 534—B cam 672 moving with gear 668 makes one revolution with the downward movement of the reciprocable member 512 during which revolution high point 774 of cam 672 has contacted roll 773 closing contact 771 and 772 completing a circuit through leads 789 and 790 which furnish current through contacts 753 and 754 to electromagnets 719 and 729. The high portions of cams 672 and 746 are so phased or arranged that contacts 753 and 754 are closed during every other closure of contacts 771 and 772. With the energization of electro-magnets 719 and 729 the armatures 717 and 727 are attracted and the stop members 716 and 726 release pins 715 and 725, respectively, permitting members 714 and 744 to make one revolution with shaft 624. Member 714 in rotating carries with it cam 802 whose high portion 801 closes contact between spring contacts 761 and 762. Closure of these contacts completes a circuit for electro-magnet 763 and this electro-magnet energizes, attracting its armature 895 to close spring contacts 764 and 765. Closure of these contacts completes a circuit for the energization of lamps 571—A and 571—B for a period dependent upon the length of exposure selected by varying the length of the high portion of the cam 802. During such time as lamps 571—A and 571—B are illuminated the document placed on glass platen 573 (Fig. 3) is illuminated and the light therefrom is picked up by the objective lens 547 which casts an image of said document upon the film in the upper film track whose aperture 517 (Fig. 2) is in its extreme downward position. When the dwell of cam 802 arrives opposite the roller 799 the circuit of lamps 571—A and 571—B is opened and the exposure is complete. Simultaneously with the movement of cam 802 cams 724 and 803 are turned on shaft 624 with member 744. During this operation, however, the cam 803, while it closes contact 732 and 733 and causes electro-magnet 738 to be energized, is ineffective because switch C is open. However, cam 724 just before it returns to its initial position and after contacts 761 and 762 have been opened by cam 802 the high portion 775 of cam 724 momentarily closes spring contacts 734 and 735. The closure of contacts 734 and 735 for a brief period completes a circuit for electro-magnet 891 by way of the following circuit:

Battery lead 151, conductor 787, conductor 737, contacts 734 and 735, conductor 736, switch A in closed position, conductor 636, switch I in closed position, conductor 637, conductor 721 to electromagnet 891 and conductor 788 to battery lead 150. The momentary energization of electromagnet 891 causes its armature to be again attracted permitting pin 712 and gear 668 to make a second revolution. The second revolution of gear 668 causes gears 534—A and 534—B (Fig. 2—A) to be turned one-half a revolution thus raising the frame member 512 (Fig. 2). When the frame member 512 (Fig. 2) is raised, rack member or ratcheting arm 519—B turns ratchet 521—B and sprocket 509—A to take up the slack created in the film 513 by the rise of member 512. With the rotation of ratchet wheel 521—B and sprocket 509—A the pulley 510—A (Fig. 1) is rotated and spring belt 505—A driven therefrom actuates the film take up arrangement.

During the revolution of gear 668 (Fig. 6) just above discussed the cam 672 rotating therewith is ineffective to complete a further circuit due to the fact that at this time cam 746 is in such a position that the roller 747 is within the dwell and contacts 753 and 754 remain open during this one-half revolution of cam 746.

Cam 227 is ineffective during this operation inasmuch as switches F, G and H—I are open and the serial closing of contacts 751, 752 or contacts 755, 756 or 226 and 228 is without effect.

A second document may now be placed on the platen 573 (Fig. 3) and the exposure thereof initiated by the momentary closing of switch E (Fig. 6) as above, to reproduce further documents.

The operation of the machine as a reading machine or visual projector from the upper film track will next be described.

In this case the film 513 (Fig. 1) is exposed or processed film and it may be the film produced after development of the film exposed as above. No film is in the lower track.

In this case the glass platen 573 (Fig. 3) is replaced by a ground glass or other suitable translucent screen. The processed film is threaded through and fed in the same manner as the unexposed film. Automatic indexing in either direction of the film a frame at a time may be accomplished by rocking the arm 532 to either of its positions as discussed above. In this case switch A (Fig. 6) is open and switches B, C and D are closed. The mirror 575 (Fig. 3) and the switches F, G and H—I remain in the position as discussed above in connection with the operation of the machine as a camera. Switch E is then momentarily closed as discussed above. The closure of switch E causes electro-magnet 891 to be energized and gear 668 is then permitted to turn one revolution thus bringing the upper and lower film apertures together as before. Electro-magnet 729 is energized permitting cams 803 and 724 to make one revolution. This revolution is without effect, however, because switch A is open and switch B in shunt with contacts 732 and 733 is already closed permitting electro-magnet 738 to energize and close contacts 740 and 741 to complete a circuit for the lamp 543. The lamps 571—A and 571—B are not illuminated in this operation inasmuch as switch D is closed preventing the energization of electro-magnet 719, and escape of cam 802. The light from lamp 543 is reflected upwardly by mirror 542 (Fig. 2) to pass through the condensing lens 540 and on to the film 513 appearing in the frame 516 which is now in its downward position. The light passing through the film is picked up by the lens 547 which casts an image on the viewing plate or ground glass screen 573 (Fig. 3).

As switch A is open, contacts 734 and 735 have no effect upon electro-magnet 891, thus a projected image may be held on the viewing screen for as long a time as the operator desires. To proceed to the next adjacent picture the operator only needs to momentarily close switch E thus initiating the second cycle of movement of the film feed and indexing mechanism.

The operation of the machine as a reading machine for visual projection from the lower film track will next be described.

In this case the film 513 (Fig. 2) is removed from across the aperture 516 and processed film 897 is threaded over sprockets 610, 612, 613 and 614 across the aperture 517 of the lower film track. In this operation the switches remain the same as when operating the machine as a projector from the upper film track with the exception that switches F, G and H—I are closed and switches L, J and 225 (Fig. 6) are open. When a document image on said film has been chosen and indexed by either of the methods described in application Serial Number 88,903 and electro-magnet 400 has been de-energized with the stopping of the film, armature 898 is forced outward by the tension of springs 401. The outward motion of armature 898 carrying pin 760 operating in the slot 759 of the pivoted lever 757 causes the point of the pivoted lever 757 to strike against the hinged member 766 while passing, thus exerting force against the hinge 767 closing spring contacts 769 and 770.

When these contacts are closed electro-magnet 891 is energized by the following circuit:

Battery lead 151, conductor 787, contacts 769, 770, conductor 721, electro-magnet 891, conductor 788 to battery lead 150. The operations of the machine from this point on are similar to those described above in connection with the machine operating as a reading machine or visual projector from the upper film track except for certain differences pointed out hereinafter.

The switch E is manually closed for a short interval to cause the second cycle of operation to take place after the operator has viewed the particular image that has been selected. Upon the manual closing of switch E electro-magnet 891 is again operated permitting gear 668 to make another revolution. As gear 668 makes one revolution gear 534—B and cam 227 make one-half revolution. During this second half revolution of cam 227 the high portion 776 thereof strikes roll 750 closing contacts 751 and 752 allowing current to pass through switch F and past switch L into the key resetting mechanism described in detail in my application Serial Number 88,903. As high portion 776 of cam 227 continues its rotation it strikes against roll 749 closing contacts 755 and 756 allowing current to flow through switch G and past switch J energizing electro-magnet 785 by way of the following circuit; battery lead 150, electro-magnet 785, conductor 807, contacts 755 and 756, switch G and battery lead 151. The energization of electro-magnet 785 for a short period of time releases pin 780 from being held by stop member 783 mounted on the armature 784 of electro-magnet 785. Cam 707 is thus permitted to make one revolution. As the cam 707 rotates the cam follower roller 781 lying in cam slot 779 causes the crank or rod 708 to be actuated to feed a second punched card into a punched card sensing assembly familiar to the art.

As high portion 776 on cam 227 continues its rotation it strikes roll 748 closing contacts 226 and 228 causing the circuit to be made through switch H—I and past switch 225 into the reset circuit shown in detail in my application Serial Number 88,903.

As this reset circuit is closed the drive mechanism for film 897 (Fig. 2) resumes its operation and continues to operate until another document is chosen by one of the two methods set forth in application 88,903. If it is desired switch B may be opened in the above operation in which case the period within which an image is projected onto the viewing screen 573 (Fig. 3) would be limited to the time that the high portion 778 of cam 803 is exposed to roll 731 controlling the energization of lamp 543 as previously described.

The operation of the machine to make contact prints upon the upper film track from a processed film carried in the lower film track will next be described.

The operation of the machine in this case differs from the operation of the machine as a visual reading projector from the lower film track in certain respects which are set forth below.

Processed film (negative or positive) is carried in the lower film track while unexposed film 513 is carried in the upper film track. In this case the ruby glas 537 is swung into position to completely cover the aperture of lens 547 in order to exclude light from above from falling upon the sensitized film in the upper film track.

When a desired frame of the film carried in the lower film track has been selected by the operation outlined above with respect to the selection and indexing of film in the lower film track, with switches B, L, J and 225 open and with switches A, C, D, I, F, G and H—1 closed electro-magnet 891 is energized with the de-energization of electro-magnet 400 as outlined above in connection with the selection of a film on the lower film track and gear 668 is permitted to make one revolution. In making this revolution the film 513 in the upper film track is brought downwardly across the aperture 516 until it lies in contact with the film 897 across aperture 517. When this action is taking place cams 672 and 746 are active jointly to energize the circuit of electro-magnet 729 by way of the following connections:

Battery lead 150, conductor 790, switch D, conductor 720, electro-magnet 729, conductor 721, contacts 771 and 772 in closed position, contacts 753 and 754 in closed position, conductor 789 back to battery lead 151. The energization of electro-magnet 729 releases member 744 and cams 724 and 803 and permits them to make one revolution. Cam 803 in rotating closes spring contacts 732 and 733 completing a circuit for electro-magnet 738 by way of the following circuit:

Battery lead 151, conductor 791, contacts 732, 733, electro-magnet 738, conductor 792 and to battery lead 150. The energization of electro-magnet 738 and the attraction of armature 739 closes spring contacts 740 and 741 completing a circuit to the lamp 543 by way of the following circuit:

Power lead 110, switch C in closed position, conductor 742, spring contacts 740 and 741 in closed position, lamp 543, and thence to power lead 111. The lamp 543 remains illuminated during the period that the high portion 778 of cam 803 is in contact with roller 731. During this period light from the lamp 543 is reflected by mirror 542 upwardly through condensing lens 540 onto the processed film over aperture 517 through this film on to the unexposed film over aperture 516 to expose the same. As cam 803 revolves the dwell 723 of this cam comes opposite the roller 731 permitting the opening of spring contacts 732 and 733 to de-energize the electro-magnet 738 thus opening the circuit of lamp 543 to extinguish the same. A short period after the lamp 543 is extinguished the high portion 775 of the cam 724 comes into opposition with the roller 730 closing a circuit between spring contacts 734 and 735 to complete a circuit for the energization of electro-magnet 891 by way of the following circuit:

Battery lead 151, conductor 787, conductor 737, spring contact 735, spring contact 734, conductor 736, switch A in closed position, conductor 636, switch I in closed position, conductor 637, conductor 721, electro-magnet 891, conductor 788 back to battery lead 150. The energization of electro-magnet 891 for the period that high portion 775 of the cam 724 is pressed against roller 730 permits the pin 712 cooperating with stop member 809 mounted on the armature 890 of electro-magnet 891 to escape allowing gear 668 to make another revolution. During this revolution of the gear 668 cams 672 and 746 are inoperative to produce the completion of any circuit. During this rotation of gear 668 the gears 534—B and 534—A are turned one-half of a revolution moving the reciprocable frame member 512 to its upper position. During this one-half of the revolution of gear 534—B, cam 227 is rotated one-half of a revolution during which time it first closes contacts 751 and 752 allowing current to pass through switch F which is closed and past switch L into the key resetting mechanism described in detail in my application Serial Number 88,903.

As the cam 227 continues its rotation, it closes contacts 755 and 756 to complete the energization of the circuit of electro-magnet 785 as outlined heretofore in connection with the projection of a visual image from the lower film track. The energization of electro-magnet 785 is followed by the release of the cam member 707 for the purpose hereinbefore described.

As cam 227 is about to complete the last portion of this half revolution it closes contacts 226 and 228 to operate a reset circuit as shown in detail in my application Serial Number 88,903.

The feeding of a second punched card into the machine as described in connection with my application 88,903 selects a second record from the film 897 and indexes it before the aperture 517 thus de-energizing electro-magnet 400 to initiate the making of a second contact print as described hereinbefore.

The operation of the machine to produce photoprints from the upper film track will now be described.

The operation of the machine to produce photo-prints from the upper film track is similar to that outlined above in connection with the projection of visual images from the upper film track with certain exceptions pointed out herein below.

In this case switch I is opened and switch A is closed to permit the automatic indexing of the film and the sensitized paper. Switches B, G, and H—1 are open and switches C and D are closed. Processed film is loaded into the upper film track as set forth above in connection with the projection of a visual image from the upper film track. The ruby glass 537 is removed from in front of the objective lens 547, and the mirror 575 is swung so that it lies against the abutment 576 (Fig. 3). Switch E is closed manually when it is desired to make a photo print from a particular document image. Closure of switch E causes the energization of electro-magnet 891 and the release of gear 668 which makes one revolution bringing the film 513 across the aperture 516 to its downward position, as set forth above, at which time electro-magnet 729 is energized as disclosed above permitting cams 724 and 803 to make one revolution. During the first portion of the revolution of these cams spring contacts 732 and 733 are closed energizing electro-magnet 738 and completing the circuit of lamp 543 as described above. Lamp 543 when illuminated causes light to be reflected from mirror 542 upwardly through condensing lens 540 onto the film 513 across the aperture 516. The light thus transmitted through the film across the aperture 516, is gathered by the objective lens 547 which casts an image of the film within the frame upon the sensitized paper 549 appearing immediately behind the transparent paper holding platen 564 (Fig. 3).

The sensitized paper 549 is thus exposed to the projected light gathered by the lens 547 and cast as an image on the sensitized sheet through the intermediary of the reflecting mirror 575 above lens 547. When cam 803 (Fig. 6) has turned to such a position that the roller 731 falls within the dwell 723 the lamp 543 is extinguished as above set forth and the exposure of the photo print is complete. After the completion of the exposure as described above, cam 775 closes the circuit between spring contact 734 and 735 to complete the circuit of electro-magnet 634 (Fig. 4) by way of the following circuit:

Battery lead 150, conductor 788, electro-magnet 891, conductor 721, conductor 637, electro-magnet 634 (Fig. 4), conductor 636 (Fig. 6), switch A in closed position, conductor 736, contacts 734 and 735, conductor 737, conductor 787 and back to battery lead 151. It is thus seen that electro-magnets 634 (Fig. 4) and 891 (Fig. 6) are energized in series. The energization of electro-magnet 891 permits gear 668 to make a revolution and return the reciprocable frame member 512 and the aperture 516 to its upward position preparatory to the making of a second exposure. The energization of electro-magnet 634 (Fig. 4) attracts the armature 633 withdrawing stop member 632, from the path of pin 631 mounted on element 587. Element 587 and gear 586 are thus permitted to make one revolution with shaft 624. The rotation of gear 586 rotates gear 585, shaft 583, gear 582, gear 581, gear 580, gear 558 which drives the sprocket 555, ladder chains 560 and 559. The movement of ladder chain 559 corresponding to one revolution of gear 586 rotates the feed rolls 551 and 553 (Fig. 3) sufficient to feed a length of the paper 549 corresponding to the amount of paper exposed. The paper 549 is fed downwardly through a slot in frame member 591, Fig. 4, into the cutting and stacking compartment. Near the completion of the revolution of gear 586, conductive pin 588 comes into contact with spring contact 588—A and completes the circuit for the energization of electro-magnet 627 by way of the following circuit:

Battery 623, lead 626, electro-magnet 627, conductor 625, spring contact 625—A, gear 586, pin 588, and spring contact 588—A back to the opposite terminal of battery 623. For the purpose of simplicity the battery 623 is shown as being a separate source, however, it is to be understood that the battery or other source of potential connected to leads 150 and 151 may be used in lieu of the battery 623. The energization of electro-magnet 627 attracts the armature 628 retracting stop member 630 from the path of pin 629 mounted on member 618. Member 618 together with the gear 617 then makes one revolution with shaft 624. The rotation of gear 617 causes gear 616 to be turned one rovlution revolving shaft 601 and cams 614—A and 599. The rotation of cam 599 actuates the cut-off knife 595 only after an exposure of the sensitized paper 549 has been fed downward responsive to the movement of gear 586. The actuation of the cut-off knife 595 is accomplished by means of the cam 599 pushing cam follower roller 598 against the spring 597 thus moving rod 597—A and link 593 pivoted to the rod 597—A and the cut-off knife 595. Subsequent to the movement of cut-off knife 595 across the aperture in frame member 591 cam 614—A comes to such a position that the cam follower roller 613—A falls into the dwell in cam follower roller 614—A permitting the cam follower roller 613—A to be pushed outwardly by spring 619 thus retracting rod 612—A and link 610—A pivoted thereto and to the stacking lever 604 to move the stacking lever to bring the severed sheet of exposed paper 549 into the sheet receiving drawer 900. As shaft 601 continues to rotate, stacking lever 604 and cut-off knife 595 are retracted into the position shown, responsive to the movement of the cams 599 and 614—A as the pin member 629 approaches the stop member 630. After a number of exposures have been made the paper receiving drawer 900 may have its cover 640 slid thereof and the same may be removed and the paper taken in the light tight drawer 900 to the dark room for development.

In the operation of the machine just revealed document images may be reproduced from film traveling in the upper film track by repeated manual depression of the switch E.

The operation of the machine to produce photo-prints from the lower film track will next be described.

In this operation the switches F, G and H—1 (Fig. 6) are closed; L, J and 225 are open, the remaining switches are left as set forth in the operation of the machine to produce photo prints from the upper film track. Processed film is carried on the sprockets 610, 612, 613 and 614 (Fig. 2) and the film 513 in the upper film track is removed from over the aperture 516. When a desired document image has been selected as outlined above in connection with the disclosure of my application 88,903, the electro-magnet 400 (Fig. 6) is deenergized, closing contacts 769 and 770 as disclosed hereinbefore and initiating the energization of electro-magnet 891. The energization of this electro-magnet permits gear 668 to make one revolution and thereby operate electro-magnet 543 and 729 to control the illumination of lamp 543 and the subsequent closure of contacts 734 and 735 to complete a circuit for electro-magnet 634 (Fig. 4), and 891 (Fig. 6), as disclosed above, to make an exposure and automatically to cut off and stack the piece of sensitized paper containing said exposure, whereupon the selection of another document by either of the methods possible causes the cycle to be repeated and another photo print made.

For purposes of simplicity a camera projection printer and reading machine of the fixed focus type have been disclosed, however, it will be readily appreciated that small changes, known to the art, may convert this camera projection printer and reading machine to the changeable focus type.

It will be understood that trailers and leaders of blank film of desirable length may be spliced in the beginning and end of each reel of film to assist in threading the film on the various sprockets and to enable the proper alignment of the desired film image and the aperture to be made.

It is to be further understood that other machines, known to the art, may be connected either directly or indirectly to this machine with results satisfactory to both. Thus, as disclosed on Fig. 9 of the drawings of my application Serial Number 88,903 a card punching machine of a familiar type may be interposed in the counter circuit in such a manner that when a number is set up on the film counter, an electrical contact will be established with the corresponding keys of the card punch, causing them to punch into the card the number set up in the film counter, to automatically synchronize the card with its corresponding document image or picture.

In the above description and drawings certain conventional elements well known in the art of mechanics and photography have been omitted for the purpose of simplicity. It is to be understood, however, that pressure rollers may be used in opposition, to any or all of the sprockets shown, to hold the film taut against the sprockets, and that continuous light sources may be used instead of interrupting the supply thereto in which case it would be necessary to provide the machine with appropriate shutters which are opened at times corresponding to the period that the lamps are illuminated. It is further understood that the various hand-operated switches, levers, selecting devices, etc. disclosed herein may be operated in certain cases by a single lever or switch and that the various friction clutches disclosed herein may have substituted therefor positively connected clutches that apply no load to the main driving shaft except when they are being driven thereby and that such other modifications and changes may be made in the system as are within the skill of one versed in the art, and that the invention herein is not intended to be limited to the specific devices shown but to include the reasonable equivalent thereof.

This invention may be used by or for the Government of the United States for all governmental purposes without the payment of any royalty thereon.

What I claim is:

1. A photographic machine comprising a member provided with a film gate aperture therein, a first and second film magazine, feed sprockets adapted to guide film from one of said film magazines across the film gate aperture in said member and into the other of said film magazines, means for reciprocably moving said member normal to the surface of the film carrier across the aperture therein, means for preventing film from being withdrawn from the second of said magazines but permitting it to be withdrawn from the first of said magazines during the movement of said member in one direction, and means for feeding the film withdrawn from said first magazine into said second magazine during movement of said member in the other direction.

2. A photographic machine in accordance with claim 1, including means adapted to be selectively set to cause the film to be fed from the first to the second magazine or vice-versa.

3. A photographic machine including a reciprocable film gate member, a pair of film sprockets adjacent said member, each of said sprockets having a ratchet wheel mounted to rotate therewith, a pair of rack members pivotally mounted on said reciprocable member and adapted to rotate respective ones of said ratchet wheels during movement thereof in one direction, a pair of pawl members adapted to coact with respective ones of said ratchet wheels to prevent rotation thereof in one direction, and means for selectively retracting the rack member and pawl member from one of the ratchet wheels while permitting the rack member and pawl member associated with the other ratchet wheel to coact therewith whereby film carried by said sprockets and over said gate member may be selectively driven by either of said sprockets to step the film forward or backward.

4. A photographic system comprising a pair of film aperture members the apertures of which are in optical alignment, means adapted to feed film across the aperture of one of said members at a high rate of speed, means adapted to feed film across the other of said members a frame at a time, a continuously revolving shaft, a source of illumination, a movement initiating device, means responsive to the actuation of said movement initiating device for moving at least one of said film feeding devices under power from said continuously revolving shaft, and means responsive to the movement of the film feeding device for energizing said source of illumination.

5. In a projection printer, in combination, means for holding a desired length of sensitized paper flat, means for exposing said desired length of paper and means responsive to the completion of the exposure of said length of paper for withdrawing it from said holding means, means responsive to the withdrawal of said paper after the exposure thereof for cutting the exposed portion from the remainder thereof, and means for stacking the portions cut therefrom, comprising a pivoted stacking arm and cam actuated means for reciprocally rocking said stacking arm into and out of stacking position subsequent to the cutting of the exposed portion of said paper from the remainder thereof.

6. A projection printer in accordance with claim 5 in which a light tight drawer with its cover removed may be placed to receive the paper under control of said stacking means.

7. In a machine of the class described, a magazine for housing a roll of sensitized paper, an exposed paper receiving drawer, an exposure station between said roll and said drawer, means for intermittently feeding the paper from said magazine past said exposure station to said exposed paper receiving drawer a predetermined length at a time, drive mechanism for said feeding means comprising a constantly revolving shaft, optical means for exposing the paper at said exposure station, means responsive to the exposure of said paper for actuating said feeding means to cause it to be driven by said drive mechanism to feed the exposed portion of said paper past said exposure station, an exposed paper severing means, means responsive to the actuation of said feeding means for actuating said severing device to sever the exposed portion of said paper from the roll and stacking means responsive to the actuation of said severing means for stacking the severed portion of said paper into said paper receiving drawer.

8. A machine in accordance with claim 7 in which said severing and stacking means are actuated by power from said continuously revolving shaft.

9. A machine in accordance with claim 7 in which said paper receiving drawer is provided with a light tight cover, whereby it may be closed and removed from the machine to a dark room without further light reaching the paper therein.

10. A machine in accordance with claim 7 including an electro-magnet and means responsive to the energization of said electro-magnet for initiating the operations of feeding, cutting and stacking.

11. A reading machine comprising a translucent viewing screen, a pair of film magazines, a film gate member over which processed film may be carried from one of said magazines, a source of illumination for projecting light through the film gate member toward said translucent viewing screen, a lens located between said screen and said gate member, a control switch, means responsive to the momentary closure of said control switch for moving said film gate member and the film carried thereby normal to the surface of said film to such a position that said lens casts a sharp image of the film onto said viewing screen, and means responsive to a second momentary closure of said control switch for moving said film gate member to its initial position.

12. A reading machine in accordance with claim 11 including means for indexing the film over said gate member one step each time said member is moved from its initial position.

13. An optical projection device comprising a gate member of relatively small size, a lens, and a gate member of relatively large size arranged in the order named so that the two gate members may be located at such different distances from the lens as to enable the lens to cast an image of either gate onto the plane of the opposite gate, a source of illumination disposed beyond said gate member of relatively small size on line with said lens and gates, a second source of illumination arranged to illuminate a document carried across the gate member of large size, sprocket means associated with said gate of small size, a continually revolving shaft, clutch members associated with said shaft, electro magnetic clutch energizing and deenergizing means associated with said clutches, a plurality of selective control switches, means responsive to the closure of one of said control switches for energizing one of said clutches and permitting a first cam means carried thereby to be rotated, means responsive to the energization of said clutch for rotating said sprocket means and indexing a film carried by said sprocket means, means responsive to the rotation of said first cam means for initiating the operation of a second cam means and means responsive to the operation of said second cam means for energizing one of said sources of illumination.

14. A device in accordance with claim 13 including means for selectively predetermining the source of illumination to be energized, whereby the device may be selectively used as a camera for photographing documents across the relatively large gate onto a sensitized film across the relatively small gate or as an enlarging projector for projecting an image of a film record carried across said small gate onto the plane of said large gate for reading thereof on a translucent screen or copying onto a sensitized sheet.

15. A device in accordance with claim 13 including punched card means for indexing a preselected frame of film across said small gate corresponding to the designation of said card.

16. A device in accordance with claim 3 including a fixed film gate member positioned to lie adjacent to said reciprocable film gate member in one of its said positions.

17. A device in accordance with claim 4 including a copying platen viewing screen gate member displaced from said film aperture member and a lens between said members so positioned that said members occupy positions corresponding to conjugate focal planes of said lens.

LEONARD G. TOWNSEND.